(12) United States Patent
Kouno et al.

(10) Patent No.: US 12,483,147 B2
(45) Date of Patent: Nov. 25, 2025

(54) AUXILIARY POWER SUPPLY DEVICE HAVING RESONANT CIRCUIT

(71) Applicant: KABUSHIKI KAISHA TOSHIBA, Tokyo (JP)

(72) Inventors: Yuusuke Kouno, Tokyo (JP); Toshiyuki Baba, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 222 days.

(21) Appl. No.: 18/068,689

(22) Filed: Dec. 20, 2022

(65) Prior Publication Data

US 2023/0198416 A1 Jun. 22, 2023

(30) Foreign Application Priority Data

Dec. 21, 2021 (JP) ................. 2021-207053

(51) Int. Cl.
*H02M 3/335* (2006.01)
*H02M 1/32* (2007.01)
*H02M 3/00* (2006.01)

(52) U.S. Cl.
CPC ......... *H02M 3/33571* (2021.05); *H02M 1/32* (2013.01); *H02M 3/01* (2021.05)

(58) Field of Classification Search
CPC ............ H02M 7/4811; H02M 7/4815; H02M 1/4818; H02M 3/01; H02M 3/33571; H02M 1/0009; H02M 3/015; H02M 7/4818; G01R 31/64; G01R 31/42
See application file for complete search history.

(56) References Cited

U.S. PATENT DOCUMENTS

| | | | |
|---|---|---|---|
| 9,124,168 B2* | 9/2015 | Sun | H02M 5/00 |
| 10,919,399 B2* | 2/2021 | Kotani | H02J 7/00 |
| 12,294,126 B2* | 5/2025 | Hagiwara | H02M 3/156 |

(Continued)

FOREIGN PATENT DOCUMENTS

| | | |
|---|---|---|
| JP | 2014-233121 A | 12/2014 |
| JP | 6067136 B2 | 1/2017 |

(Continued)

OTHER PUBLICATIONS

Japan Patent Office, Office Action in JP App. No. 2021-207053 (May 20, 2025).

*Primary Examiner* — Gustavo A Rosario-Benitez
(74) *Attorney, Agent, or Firm* — Finnegan, Henderson, Farabow, Garrett & Dunner, LLP (57) ABSTRACT

An auxiliary power supply device according to an embodiment includes a high-frequency transformer; a chopper to convert a DC power; an inverter to convert output power of the chopper into AC power and supply the AC power to the high-frequency transformer; a DC capacitor connected to a DC end of the inverter; a resonant capacitor to generate a resonance according to switching of the inverter; a rectifier to convert, into DC power, the AC power supplied from the inverter via the high-frequency transformer; and a controller to calculate a resonant frequency of a resonant circuit including the resonant capacitor based on a value supplied from a detector and detect a decrease in capacity of the resonant capacitor using the resonant frequency and the value of the DC input current.

6 Claims, 7 Drawing Sheets

(56) References Cited

U.S. PATENT DOCUMENTS

| | | | |
|---|---|---|---|
| 2008/0259647 A1* | 10/2008 | Risseeuw | H02M 3/158 |
| | | | 363/21.1 |
| 2013/0155729 A1* | 6/2013 | Lee | G01R 31/42 |
| | | | 363/37 |
| 2016/0224479 A1 | 8/2016 | Shigeta et al. | |
| 2016/0276955 A1* | 9/2016 | Harada | H02M 1/32 |
| 2019/0260298 A1* | 8/2019 | Kominami | H02M 3/33573 |
| 2020/0244187 A1* | 7/2020 | Shirasawa | B60L 5/00 |
| 2021/0215771 A1 | 7/2021 | Wang et al. | |

FOREIGN PATENT DOCUMENTS

| | | |
|---|---|---|
| JP | 2017-184599 A | 10/2017 |
| JP | 2017-195664 A | 10/2017 |
| JP | 2019-88043 A | 6/2019 |
| JP | 2019-201455 A | 11/2019 |
| JP | 2021-40395 A | 3/2021 |
| WO | WO 2015/079528 A1 | 6/2015 |

* cited by examiner

AUXILIARY POWER SUPPLY DEVICE HAVING RESONANT CIRCUIT

CROSS-REFERENCE TO RELATED APPLICATIONS

This application is based upon and claims the benefit of priority from Japanese Patent Application No. 2021-207053, filed Dec. 21, 2021; the entire contents of which are incorporated herein by reference.

FIELD

Embodiments described herein relate generally to an auxiliary power supply device.

BACKGROUND

For example, an electric vehicle (moving body) includes, as a power supply device, a power conversion device configured to convert a direct-current (DC) voltage supplied from a high-voltage train line (such as an overhead train line or third rail) into a voltage corresponding to a load and output the DC voltage to the load. The electric vehicle includes, as a power supply device for an electric vehicle, for example, a power supply device for driving an electric motor for traveling, and an auxiliary power supply device configured to supply power to other devices such as lighting and air conditioner.

Generally, an auxiliary power conversion device takes a configuration of an inverter and a commercial frequency transformer (isolation transformer). However, application of a high-frequency transformer (isolation transformer) is progressing in order to downsize the system. One exemplary configuration of the auxiliary power supply device includes a high-frequency transformer (isolation transformer) configured to be excited by a high-frequency alternate-current (AC) current, a chopper circuit configured to adjust a DC voltage from a train line, an inverter configured to convert an output of the chopper circuit into a high-frequency AC current and supply it to the high-frequency transformer, and a rectifier configured to convert a high-frequency AC current to a DC current. Hereinafter, the configuration including the inverter, the high-frequency transformer, and the rectifier will be referred to as a high-frequency isolation circuit.

In addition, application of a resonant circuit to the inverter reduces a switching loss significantly, thereby realizing high-frequency switching of the inverter.

However, in a case where a resonant capacitor included in the resonant circuit decreases in capacity due to deterioration over time, a rise in a resonant frequency of the resonant circuit increases a peak value and an effective value of AC current output by the inverter. This involves a risk of causing an increased loss in the inverter, the high-frequency transformer, and the rectifier, leading to a rise in temperature beyond an allowable value. The advanced deterioration of the resonant capacitor may cause stoppage of the device due to the abnormal temperature.

Monitoring of AC current output from a resonant inverter enables detection of change in current but requires an additional current detector. A resonant inverter using a half-bridge circuit is configured in such a manner that one end of the AC output is connected to a middle point of two series-connected resonant capacitors; however, it is difficult to detect using the AC current which one of the resonant capacitors decreased in capacity.

BRIEF DESCRIPTION OF THE DRAWINGS

FIG. 2 is a diagram for illustrating a current path while an upper arm of a resonant inverter shown in FIG. 1 is on.

FIG. 3 is a diagram for illustrating a current path while a lower arm of the resonant inverter shown in FIG. 1 is on.

DETAILED DESCRIPTION

An auxiliary power supply device according to an embodiment includes a high-frequency transformer; a chopper circuit configured to convert a direct-current (DC) power supplied from a DC power supply; an inverter configured to convert output power of the chopper circuit into alternate-current (AC) power and supply the AC power to the high-frequency transformer; a DC capacitor connected to a DC end of the inverter; a resonant capacitor configured to generate a resonance according to switching of the inverter; a rectifier configured to convert, into DC power, the AC power supplied from the inverter via the high-frequency transformer; a detector configured to detect a value of a DC input current of the inverter or a value for calculating the value of the DC input current; and a control circuit configured to calculate a resonant frequency of a resonant circuit including the resonant capacitor based on a value supplied from the detector and detect a decrease in capacity of the resonant capacitor using the resonant frequency and the value of the DC input current.

First Embodiment

Figure 1:
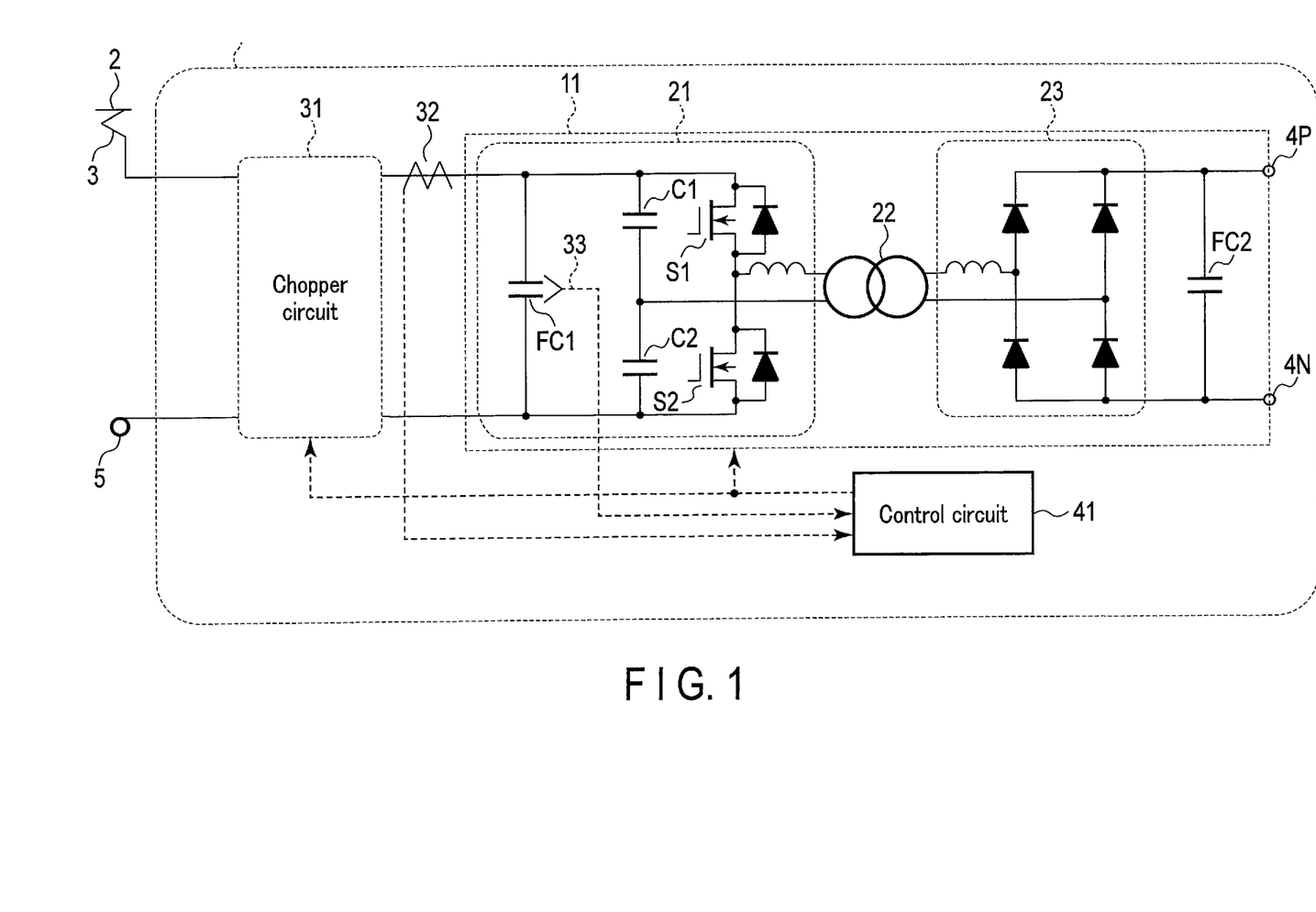
FIG. 1 is a schematic diagram showing an exemplary configuration of a power conversion device according to a first embodiment.

FIG. 1 is a schematic diagram showing an exemplary configuration of a power conversion device according to a first embodiment.

Herein, a power conversion device 1 to be installed in a moving body such as an electric vehicle will be described as an example. The power conversion device 1 for an electric vehicle is an auxiliary power supply device for an electric vehicle that receives DC power from a train line 2 such as an overhead train line or a third rail via a current collector 3 and outputs the received DC power from output terminals 4P and 4N.

In this embodiment, the power conversion device 1 for an electric vehicle will be described as an auxiliary power supply device configured to supply power to loads such as lighting and air conditioners of the electric vehicle. The electric vehicle includes a main power supply device (not shown) for driving the electric motor for traveling. The main power supply device drives the electric motor for traveling, with DC power received from the train line 2 via the current collector 3, thereby causing the electric vehicle to travel on a track 5.

The power conversion device 1 serving as the auxiliary power supply device for an electric vehicle is connected to a device configured to operate at a lower pressure than the driving motor for traveling. For this reason, the power conversion device 1 for an electric vehicle requires isolation between its primary side to which power is input and its secondary side from which power is output.

An exemplary configuration for securing insulation between the primary side and the secondary side is to isolate the primary side from the secondary side using a transformer including a pair of windings (coils) electromagnetically coupled to each other. The transformer becomes larger in size as the excitation frequency becomes lower. For example, a transformer to which an excitation frequency corresponding to a frequency of a commercial power supply is set has a large size. Therefore, the power conversion device 1 according to the present embodiment uses a high-frequency transformer to insulate the primary side from the secondary side, thereby realizing downsizing.

The power conversion device 1 includes a chopper circuit 31, a power conversion circuit (high-frequency isolation circuit) 11, a current detector 32, a voltage detector 33, and a control circuit 41.

The chopper circuit 31 converts DC power input by the train line 2 via the current collector 3 into desired DC power. In the present embodiment, for example, the train line 2 is a DC power supply.

The current detector 32 detects output current from the chopper circuit 31. A detection result of the current detector 32 is supplied to the control circuit 41.

The voltage detector 33 detects an output voltage of the chopper circuit 31 (a voltage of a first DC capacitor FC1). A detection result of the voltage detector 33 is supplied to the control circuit 41.

The power conversion circuit 11 isolates DC power output from the chopper circuit 31 using the high-frequency transformer 22, thereby converting the DC power into power for a DC load. The power conversion circuit 11 has, for example, a resonant inverter 21, a high-frequency transformer 22, a rectifier 23, and a second DC capacitor FC2.

The resonant inverter 21 is an inverter circuit configured to supply AC power to the high-frequency transformer 22 using DC power supplied from the chopper circuit 31. The resonant inverter 21 includes, for example, a DC end electrically connected to the chopper circuit 31 and an AC end electrically connected to the primary side of the high-frequency transformer 22, and is used as a resonant single-phase half-bridge inverter. The resonant inverter 21 includes a first switch S1, a second switch S2, the first DC capacitor FC1, a first resonant capacitor C1, and a second resonant capacitor C2. One of the AC ends of the resonant inverter 21 is electrically connected to the primary side of high-frequency transformer 22 via an inductance.

The first DC capacitor FC1 is connected between the DC end on a high potential side and the DC end on a low potential side of the resonant inverter 21, and smooths DC power supplied from the chopper circuit 31.

The first switch S1 switches electric connection between the DC end and one of the AC ends on the high potential side. The first switch S1 is, for example, a metal-oxide-semiconductor field-effect transistor (MOSFET) and has its source electrically connected to the DC end on the high potential side, and its source electrically connected to one of the AC ends.

The second switch S2 switches electric connection between the DC end and one of the AC ends on the low potential side. The second switch S2 is, for example, a MOSFET and has its drain electrically connected to one of the AC ends and its source electrically connected to the DC end on the low potential side.

The first switch S1 and the second switch S2 are not limited to the MOSFET. For example, other power semiconductor elements such as a bipolar transistor and an insulated-gate bipolar transistor (IGBT) may be used as the first switch S1 and the second switch S2.

The first resonant capacitor C1 is electrically connected between the DC end on the high potential side and the other AC end. The second resonant capacitor C2 is electrically connected between the DC end and the other AC end on the low potential side.

That is, a primary winding of a high-frequency transformer 22 is connected to a connection point (one of the AC ends) between the first switch S1 and the second switch S2 and a connection point (the other AC end) between the first resonant capacitor C1 and the second resonant capacitor C2. The resonant inverter 21 supplies AC power to the primary winding of the high-frequency transformer 22 by the control circuit 41 controlling on-off operation of the first switch S1 and the second switch S2. In the following description, in the resonant inverter 21, a side close to the first switch S1 will be referred to as an upper arm of the resonant inverter 21, and a side close to the second switch S2 will be referred to as a lower arm of the resonant inverter 21.

The high-frequency transformer 22 is an isolation transformer having a primary-side winding (primary winding) that generates magnetic flux, and a secondary-side winding (secondary winding) that is insulated from the primary winding and is excited by the magnetic flux generated in the primary winding. In the case of AC current being supplied from the resonant inverter 21 to the primary winding of the high-frequency transformer 22, magnetic flux is generated in the primary winding. The magnetic flux generated in the primary winding generates an induced current in the secondary winding. In this manner, the high-frequency transformer 22 supplies power to the secondary side in accordance with the AC current input from the primary side.

The rectifier 23 is a circuit configured to rectify power generated in the secondary winding of the high-frequency transformer 22, and is configured as, for example, a rectification bridge circuit in which a plurality of diodes are combined.

The second DC capacitor FC2 smooths a DC voltage supplied from the rectifier 23. A third DC capacitor FC2 outputs DC power from the output terminals 4P and 4N coupled in parallel. The DC power output from the output terminals 4P and 4N is converted into, for example, AC current of 50 Hz or 60 Hz by a circuit such as an inverter (not shown).

The control circuit 41 acquires a detection value of the current detector 32 and a detection value of the voltage detector 33, and controls the operation of the chopper circuit 31 and the power conversion circuit 11. The control circuit 41 is a computation device including, for example, at least one processor, a program executed by the processor, and a memory storing data used by the program. The control circuit 41 can implement various functions for controlling the chopper circuit 31 and the power conversion circuit 11 by software alone or in combination with hardware.

The control circuit 41 may be configured as, for example, a logic circuit that generates a pulse signal in such a manner that the pulse signal is generated by the processor of the control circuit 41 executing programs. The control circuit 41 inputs the pulse signal to each of the chopper circuit 31 and the power conversion circuit 11, thereby controlling the operation of the semiconductor elements of the chopper circuit 31 and the power conversion circuit 11. For example, the control circuit 41 performs PWM control for adjusting an on-off duty ratio of the pulse signal. In this manner, the control circuit 41 adjusts output of each of the chopper circuit 31 and the power conversion circuit 11.

Next, an example of the operation of the control circuit 41 detecting a decrease in capacity of the first resonant capacitor C1 and the second resonant capacitor C2 in the power conversion device according to the present embodiment will be described.

Figure 2:
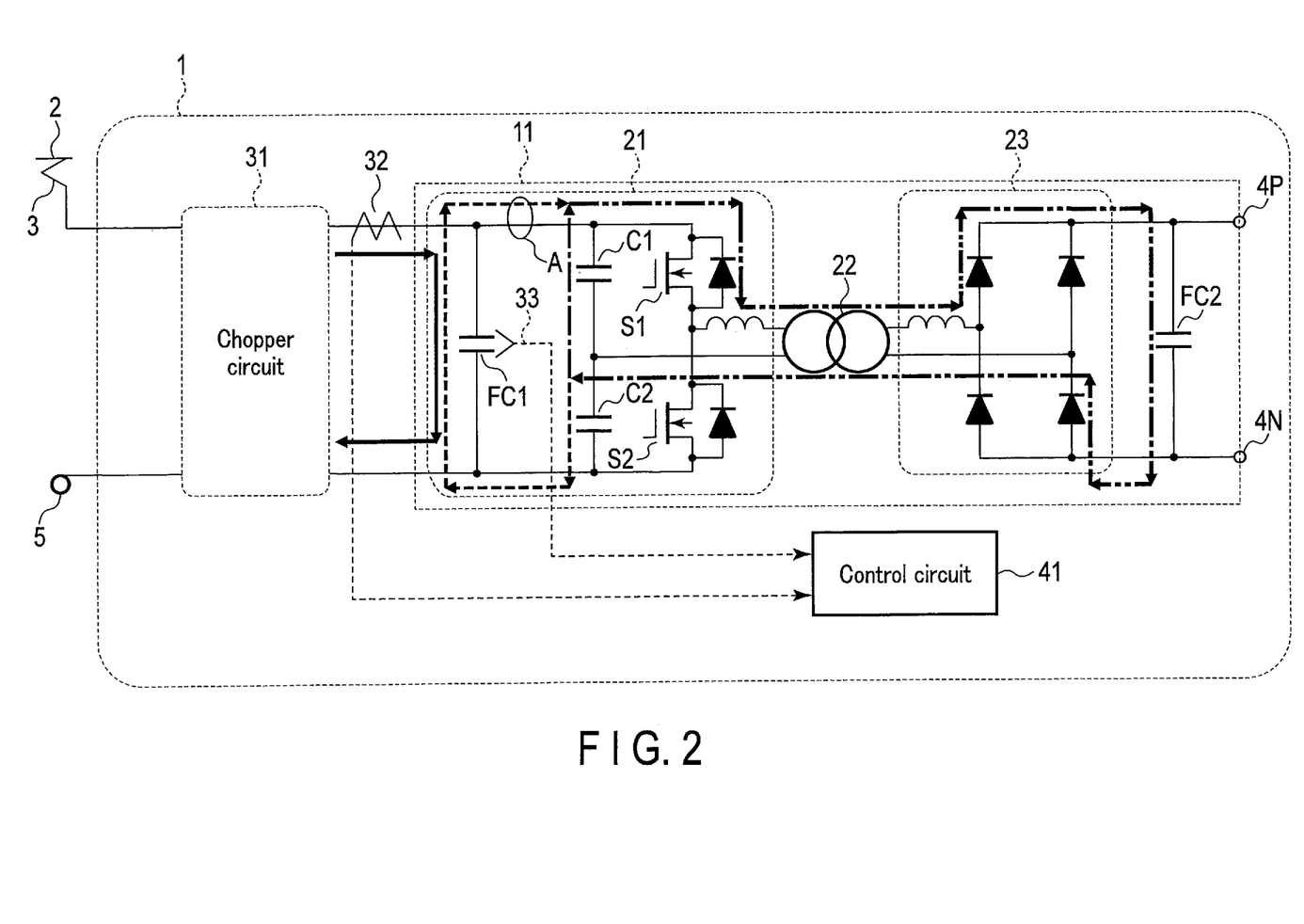

FIG. 2 is a diagram for illustrating a current path while an upper arm of a resonant inverter shown in FIG. 1 is on.

The AC current supplied to the high-frequency transformer 22 is output from the first switch S1 of the upper arm, passes through the rectifier 23 and the second DC capacitor FC2, returns to the connection point between the first resonant capacitor C1 and the second resonant capacitor C2, and is split into the first resonant capacitor C1 and the second resonant capacitor C2. A current equivalent to that of the second resonant capacitor C2 flows through a DC input portion A of the resonant inverter 21.

Figure 3:
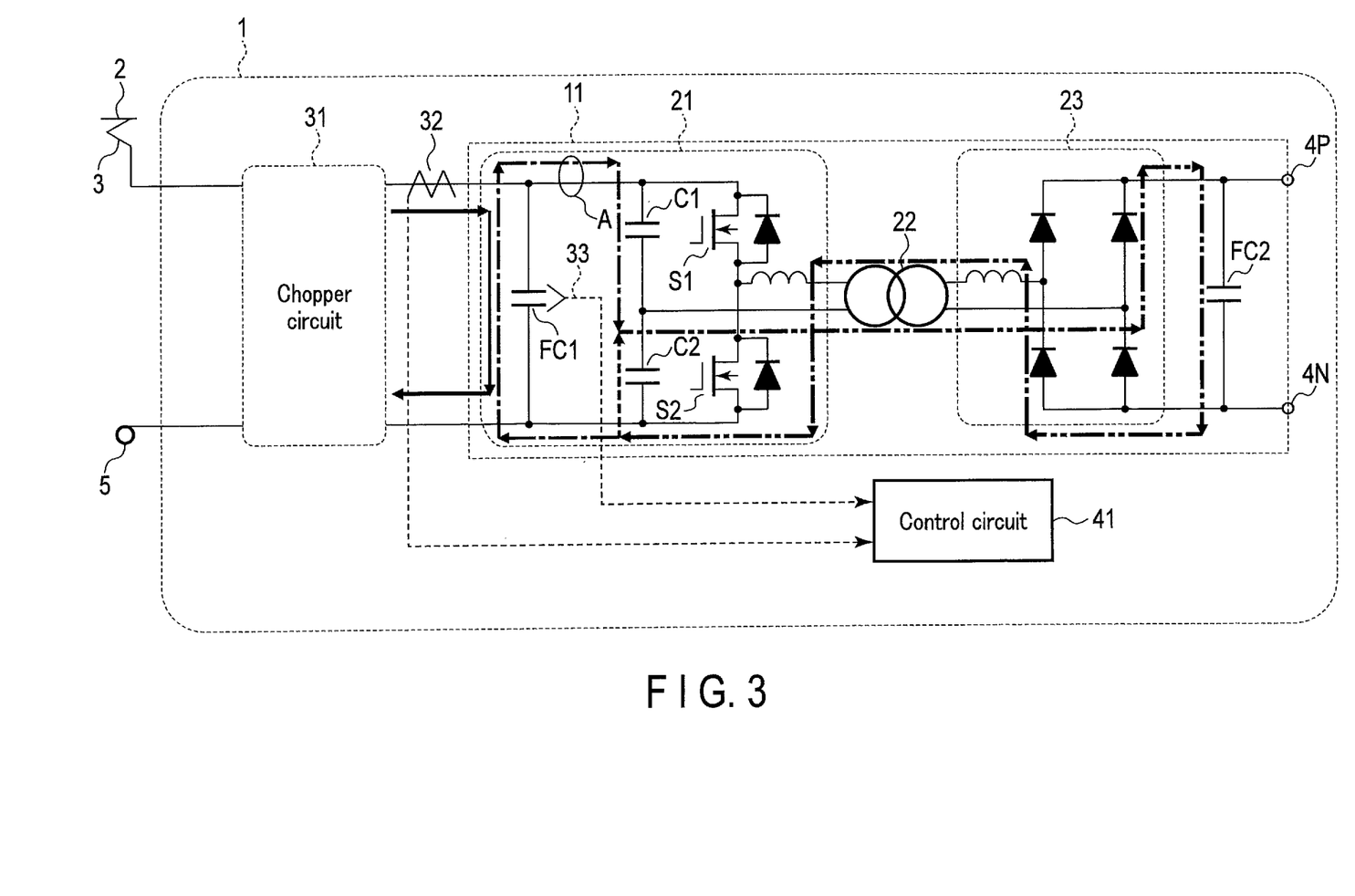

FIG. 3 is a diagram for illustrating a current path while the lower arm of the resonant inverter shown in FIG. 1 is on.

The AC current merged at the connection point between the first resonant capacitor C1 and the second resonant capacitor C2 is output to the high-frequency transformer 22. The AC current supplied to the high-frequency transformer 22 passes through the rectifier 23 and the second DC capacitor FC2, returns to the second switch S2 of the lower arm, and is split into the second resonant capacitor C2 and the first DC capacitor FC1. A current equivalent to that of the first resonant capacitor C1 flows through the DC input portion A of the resonant inverter 21.

Figure 4:
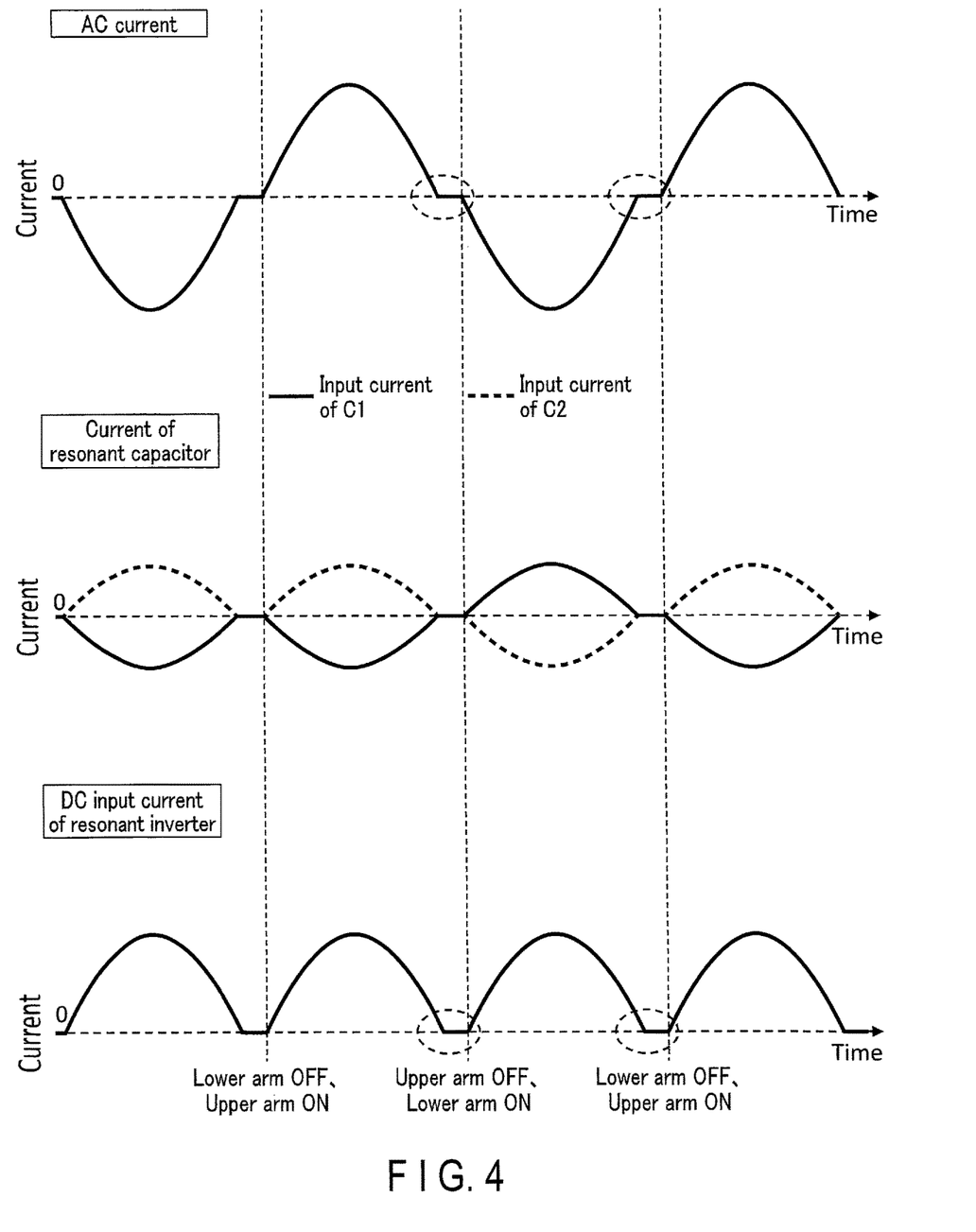
FIG. 4 is a diagram for illustrating an example of each current in the power conversion device shown in FIG. 1 in the case of the resonant capacitor having no decrease in capacity.

FIG. 4 is a diagram for illustrating an example of each current in the case of the resonant capacitor having no decrease in capacity of the power conversion device shown in FIG. 1.

A resonant current on the AC side of the resonant inverter 21 is generated by the resonance phenomenon at the resonant frequency determined by a total inductance of parallel capacitance between the first resonant capacitor C1 and the second resonant capacitor C2 and a main circuit after the first switch S1 or the second switch S2 is turned on. The diode of the rectifier 23 cuts off the current in a resonant half period, and the current value is near zero (smaller than or equal to a predetermined value) until next time the opposing arm is turned on. Therefore, detection of the cycle of timing when a value of the AC current is near zero (smaller than or equal to a predetermined value) enables estimation of the half cycle of resonance, which enables estimation of the resonant frequency of the resonant circuit including the first resonant capacitor C1 and the second resonant capacitor C2.

The current to flow through the resonant capacitors C1 and C2 is evenly split into the first resonant capacitor C1 and the second resonant capacitor C2 in the case of no decrease in capacitance. Furthermore, as described in FIGS. 2 and 3, the same current as that of the first resonant capacitor C1 or the second resonant capacitor C2 flows through the DC input portion A of the resonant inverter 21. This provides the current flowing through the DC input portion A (DC input current) with a period in which a current value is near zero (smaller than or equal to predetermined value) in the same way as the AC current. Accordingly, detection of a value of the DC input current of the resonant inverter 21 or acquisition of a value corresponding to the DC input current (for example, a calculated DC input current value) enables estimation of the resonant frequency of the resonant circuit including the first resonant capacitor C1 and the second resonant capacitor C2.

Figure 5:
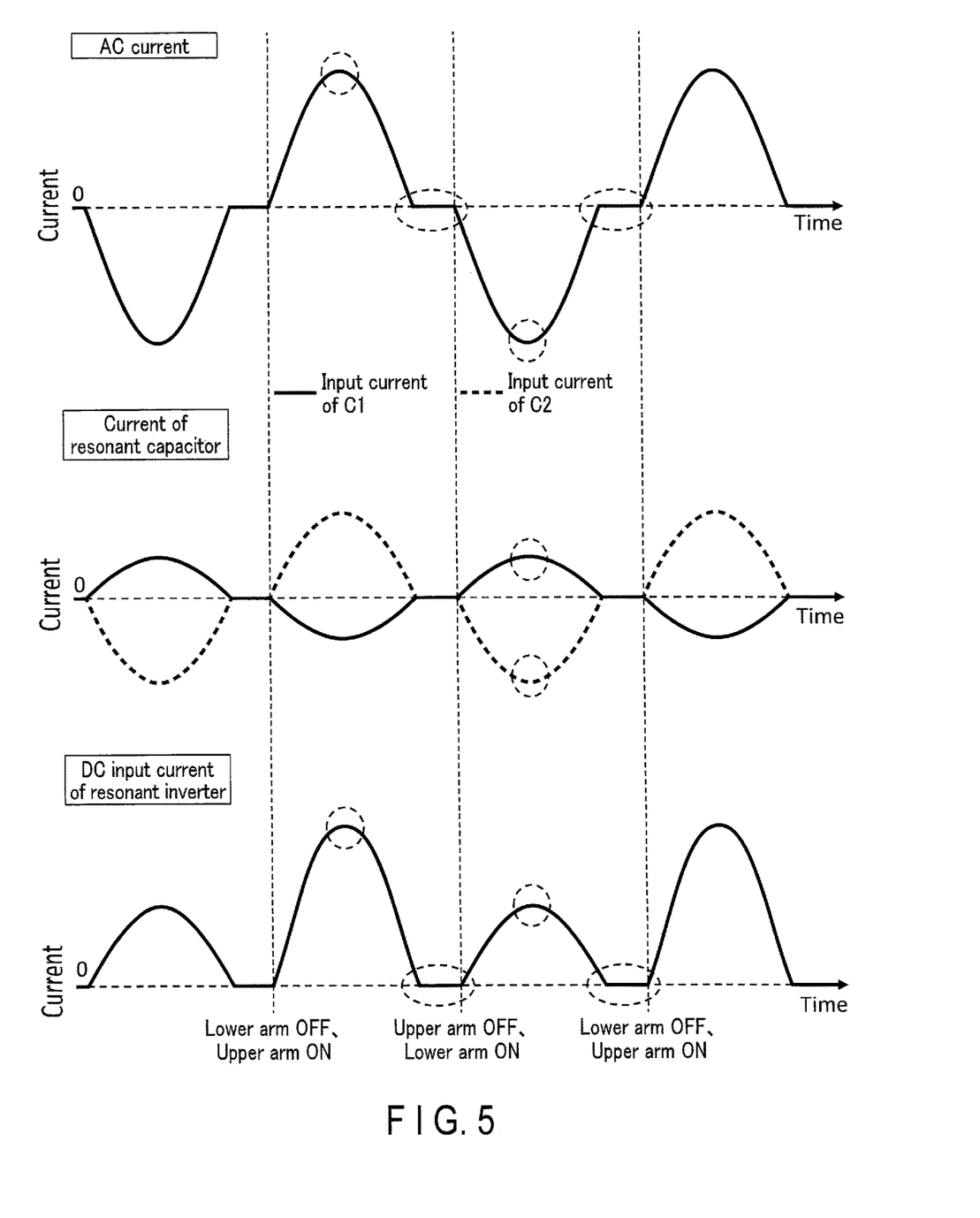
FIG. 5 is a diagram for illustrating an example of each current in the case of the resonant capacitor having a decrease in capacity of the power conversion device shown in FIG. 1.

FIG. 5 is a diagram for illustrating an example of each current in the case of the resonant capacitor having a decrease in capacity of the power conversion device shown in FIG. 1.

As described above, since the resonant frequency is determined by the parallel capacitance of the resonant capacitors C1 and C2, the resonant frequency increases in the case where a decrease in capacitance occurs.

Furthermore, the current flowing through the first resonant capacitor C1 and the current flowing through the second resonant capacitor C2 are split at the ratio of capacitance. Thus, for example, when the second resonant capacitor C2 deteriorates to cause a decrease in capacitance, the current of the first resonant capacitor C1 decreases to cause an increase in the current of the second resonant capacitor C2. However, since the AC current is a sum of the currents of the first resonant capacitor C1 and the second resonant capacitor C2, the current imbalance between the first resonant capacitor C1 and the second resonant capacitor C2 does not appear in the AC current. Thus, even if the AC current is detected, it is difficult to estimate which resonant capacitor decreases in capacity.

On the other hand, as described in FIG. 2 and FIG. 3, the same current as that of the first resonant capacitor C1 or the second resonant capacitor C2 flows through the DC input portion A of the resonant inverter 21. Thus, detection or estimation of the DC input current of the resonant inverter 21 enables estimation of a decrease in capacity of each of the first resonant capacitor C1 and the second resonant capacitor C2 by referring to the increase of the resonant frequency and the imbalance of current peak values in the resonant circuit including the first resonant capacitor C1 and the second resonant capacitor C2.

Figure 6:
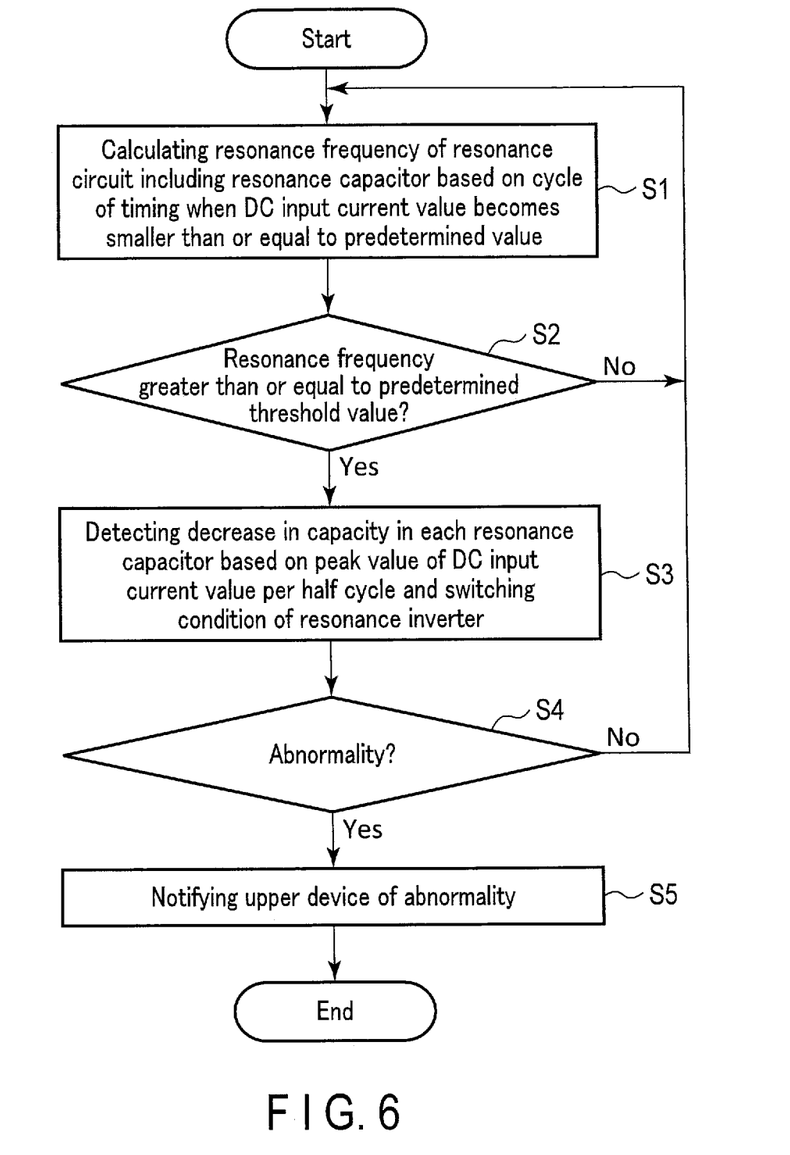
FIG. 6 is a flowchart for illustrating an example of operation of detecting an abnormality in the resonant capacitor in the power conversion device according to the first embodiment.

FIG. 6 is a flowchart for illustrating an example of operation of detecting an abnormality in the resonant capacitor in the power conversion device according to the first embodiment.

In the power conversion device according to the present embodiment, the control circuit 41 calculates the DC input current of the resonant inverter 21 using detection values of the current detector 32 and the voltage detector 33. That is, in the present embodiment, the current detector 32 and the voltage detector 33 are detectors configured to detect a value for calculating the DC input current.

In the case where a chopper output voltage detected by the current detector 32 is expressed as $i_{CH}(t)$, a chopper output voltage detected by the voltage detector 33 is expressed as $v_{DC}(t)$, and a capacitance of the first DC capacitor FC1 is expressed as $C_{FC}$, the DC input current $i_{in}(t)$ of the resonant inverter 21 is determined by the following formula.

$$i_{in}(t) = i_{CH}(t) - C_{FC}\frac{d}{dt}v_{DC}(t) \quad \text{(Formula 1)}$$

The control circuit 41 calculates the resonant frequency of the resonant circuit including the resonant capacitors C1 and C2 based on the cycle of timing when a value of the DC input current of the resonant inverter 21 calculated by the above formula becomes a predetermined value or smaller (step S1).

The control circuit 41 acquires a peak value of the DC input current in the case where the resonant frequency of the resonant circuit is a predetermined threshold value or greater (step S2). The control circuit 41 can detect a decrease in capacity of each of the first resonant capacitor C1 and the second resonant capacitor C2 based on the peak value of the DC input current per half cycle and a switching condition of each of the first switch S1 and the second switch S2 (step S3).

For example, while the upper arm of the inverter 21 is on, the current of the same value as that of the second resonant capacitor C2 flows through the DC input portion A. While the lower arm is off, the current of the same value as that of the first resonant capacitor C1 flows through the DC input portion A. Based on this, the control circuit 41 compares peak values of the DC input current in each of the switching conditions of the first switch S1 and the second switch S2. In the case where, for example, a difference between the peak values is a predetermined threshold value or greater, the control circuit 41 can detect a decrease in capacity of each of the first resonant capacitor C1 and the second resonant capacitor C2.

For example, if there is no need to specify which one of the first resonant capacitor C1 and the second resonant capacitor C2 decreases in capacity, regardless of the switching conditions of the first switch S1 and the second switch S2, the control circuit 41 compares peak values of the DC input current per half cycle. In the case where, for example, a difference between the peak values is a threshold value or greater, the control circuit 41 can detect which one of the first resonant capacitor C1 and the second resonant capacitor C2 decreases in capacity.

The control circuit 41 determines that there is an abnormality in the case of detecting a decrease in capacity of each of the first resonant capacitor C1 and the second resonant capacitor C2 or detecting a decrease in capacity of one of the first resonant capacitor C1 and the second resonant capacitor C2 (step S4), and can notify, for example, a higher-level control apparatus (not shown) of the abnormality (step S5).

For example, in a case where the first resonant capacitor C1 and the second resonant capacitor C2 decrease in capacity due to deterioration over time, a rise in resonant frequency increases a peak value and an effective value of the AC current output from the resonant inverter 21. This involves a risk of causing an increased loss in the resonant inverter 21, the high-frequency transformer 22, and the rectifier 23, leading to a rise in temperature beyond an allowable value. That is, the advanced deterioration of the first resonant capacitor C1 and the second resonant capacitor C2 may cause stoppage or breakdown of the device due to the abnormal temperature.

In the power conversion device 1 according to the present embodiment, as described above, detection of a resonant frequency of the resonant inverter 21 and a decrease in capacity of each of the first resonant capacitor C1 and the second resonant capacitor C2 (or one of them) enables a sign of abnormality to be detected while the temperature of the power conversion device 1 falls within an allowable range, thereby making it possible to avoid the stoppage or breakdown of the power conversion device 1 due to an abnormality. As described above, the present embodiment can provide a highly reliable auxiliary power supply device.

Second Embodiment

Next, a power conversion apparatus according to a second embodiment will be described in detail with reference to drawings.

In the following description, the same components as those in the above-described first embodiment will be assigned the same reference numerals, and the description thereof will be omitted.

Figure 7:
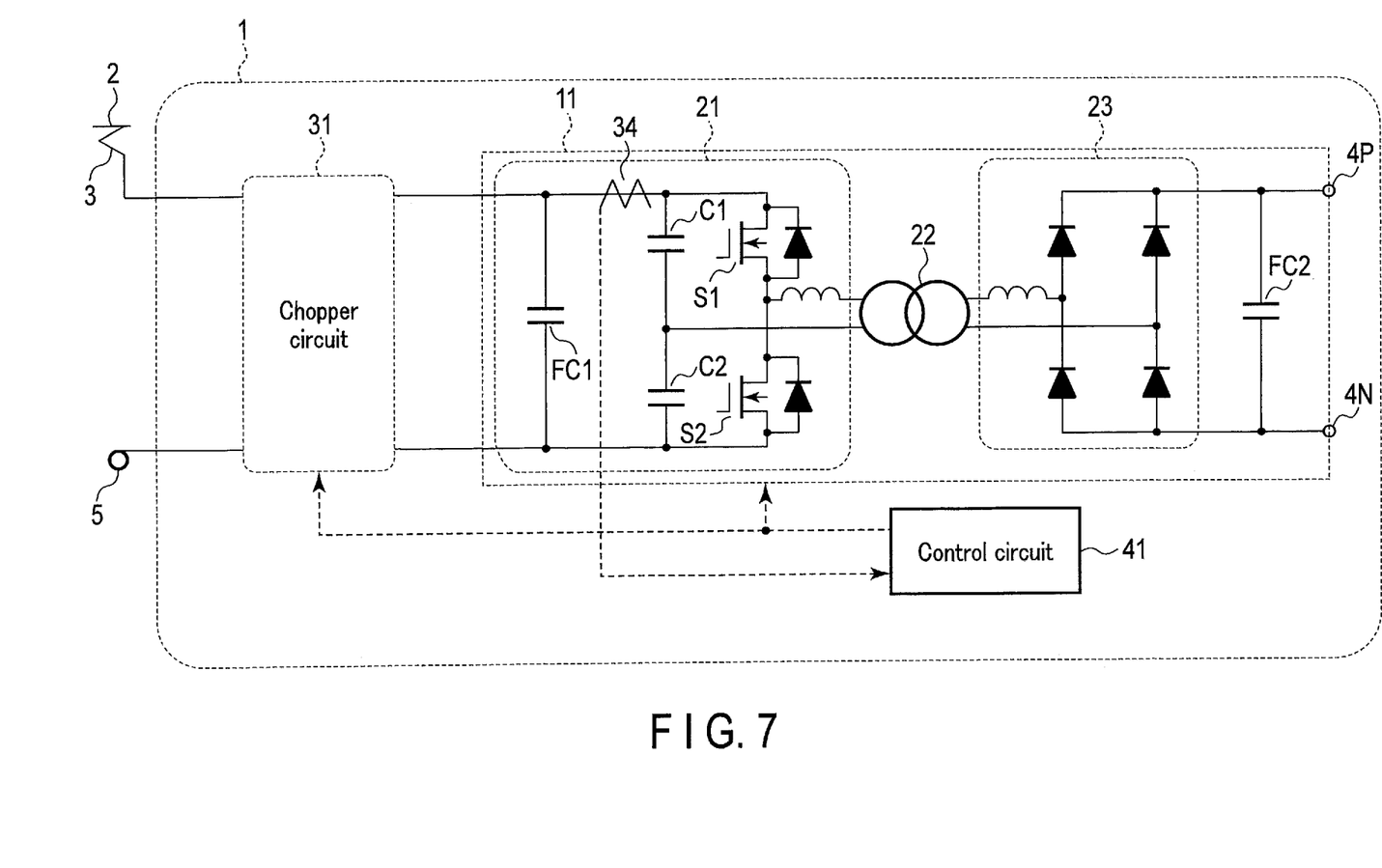
FIG. 7 is a schematic diagram showing an exemplary configuration of a power conversion device according to a second embodiment.

FIG. 7 is a schematic diagram showing an exemplary configuration of a power conversion device according to the second embodiment.

The power conversion device 1 according to the present embodiment differs from that of the first embodiment in terms of including a current detector 34 instead of the current detector 32 and the voltage detector 33.

The current detector 34 detects a current flowing to the DC input portion A of the resonant inverter 21 and supplies a detection result to the control circuit 41. That is, in the present embodiment, the current detector 34 is a detector configured to acquire a DC input current value.

That is, the power conversion device 1 according to the present embodiment enables a current value of the DC input portion A calculated by the aforementioned formula in the first embodiment to be acquired directly from the current detector 34. The control circuit 41 can detect a decrease in capacity of each of the first resonant capacitor C1 and the second resonant capacitor C2 based on the current value acquired by the current detector 34 and a switching condition of each of the first switch S1 and the second switch S2.

Therefore, the present embodiment can attain a similar advantageous effect to that of the first embodiment and provide a highly reliable auxiliary power supply device.

While certain embodiments have been described, these embodiments have been presented by way of example only, and are not intended to limit the scope of the inventions. These novel embodiments may be embodied in various forms, and various omissions, replacements, and changes can be made thereon without departing from the spirit of the invention. These embodiments and modifications thereof are included in the scope and gist of the invention, and are included in the invention described in the claims and the equivalents thereof.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An auxiliary power supply device comprising:
   a high-frequency transformer;
   a chopper circuit configured to convert a direct-current (DC) power supplied from a DC power supply;
   an inverter configured to convert output power of the chopper circuit into alternate-current (AC) power and supply the AC power to the high-frequency transformer;
   a DC capacitor connected to a DC end of the inverter;
   a resonant capacitor configured to generate a resonance according to switching of the inverter;

a rectifier configured to convert, into DC power, the AC power supplied from the inverter via the high-frequency transformer;
a detector configured to detect a value of a DC input current of the inverter or a value for calculating the value of the DC input current; and
a control circuit configured to calculate a resonant frequency of a resonant circuit including the resonant capacitor based on the value supplied from the detector and detect a decrease in capacity of the resonant capacitor using the resonant frequency and the value of the DC input current,
wherein:
the detector includes a voltage detector configured to detect a voltage of the DC capacitor and a current detector configured to detect an output current of the chopper circuit, and
the control circuit sets, as the value of the DC input current, a difference obtained by subtracting, from a current value detected with the current detector, a value obtained by multiplying a differential value of a voltage value detected with the voltage detector by a capacitance of the DC capacitor.

2. The auxiliary power supply device according to claim 1, wherein the detector includes a current detector configured to detect the value of the DC input current of the inverter.

3. The auxiliary power supply device according to claim 2, wherein the control circuit detects a timing when the value of the DC input current becomes smaller than or equal to a predetermine value, and calculates the resonant frequency based on a cycle of the timing.

4. The auxiliary power supply device according to claim 2, wherein the control circuit detects a timing when the value of the DC input current becomes smaller than or equal to a predetermine value, and calculates the resonant frequency based on a cycle of the timing.

5. An auxiliary power supply device comprising:
a high-frequency transformer;
a chopper circuit configured to convert a direct-current (DC) power supplied from a DC power supply;
an inverter configured to convert output power of the chopper circuit into alternate-current (AC) power and supply the AC power to the high-frequency transformer;
a DC capacitor connected to a DC end of the inverter;
a resonant capacitor configured to generate a resonance according to switching of the inverter;
a rectifier configured to convert, into DC power, the AC power supplied from the inverter via the high-frequency transformer;
a detector configured to detect a value of a DC input current of the inverter or a value for calculating the value of the DC input current; and
a control circuit configured to calculate a resonant frequency of a resonant circuit including the resonant capacitor based on the value supplied from the detector and detect a decrease in capacity of the resonant capacitor using the resonant frequency and the value of the DC input current,
wherein the control circuit notifies an outside of an abnormality in a case where the resonant frequency is greater than or equal to a predetermined threshold value and a difference between current peak values of the DC input current per half cycle is greater than or equal to a predetermined value.

6. An auxiliary power supply device comprising:
a high-frequency transformer;
a chopper circuit configured to convert a direct-current (DC) power supplied from a DC power supply;
an inverter configured to convert output power of the chopper circuit into alternate-current (AC) power and supply the AC power to the high-frequency transformer;
a DC capacitor connected to a DC end of the inverter;
a resonant capacitor configured to generate a resonance according to switching of the inverter;
a rectifier configured to convert, into DC power, the AC power supplied from the inverter via the high-frequency transformer;
a detector configured to detect a value of a DC input current of the inverter or a value for calculating the value of the DC input current; and
a control circuit configured to calculate a resonant frequency of a resonant circuit including the resonant capacitor based on the value supplied from the detector and detect a decrease in capacity of the resonant capacitor using the resonant frequency and the value of the DC input current,
wherein:
the inverter includes an upper arm switch and a lower arm switch, and
the control circuit notifies an outside of an abnormality in a case where the resonant frequency is greater than or equal to a predetermined threshold value and a difference is greater than or equal to a predetermined value, the difference being a difference between a current peak value of the DC input current while the upper arm switch is on and the lower arm switch is off and the current peak value while the upper arm switch is off and the lower arm switch is on.

* * * * *